United States Patent [19]

Pinto

[11] 4,383,982
[45] May 17, 1983

[54] AMMONIA PRODUCTION PROCESS

[75] Inventor: Alwyn Pinto, Middlesbrough, England

[73] Assignee: Imperial Chemical Industries PLC, London, England

[21] Appl. No.: 307,514

[22] Filed: Sep. 30, 1981

[30] Foreign Application Priority Data

Oct. 14, 1980 [GB] United Kingdom ............... 8033131

[51] Int. Cl.³ .............................................. C01C 1/04
[52] U.S. Cl. ..................................... 423/359; 423/656
[58] Field of Search .......................... 423/359, 360, 361

[56] References Cited

U.S. PATENT DOCUMENTS 3,598,527 8/1971 Quartulli et al. .................... 423/361

FOREIGN PATENT DOCUMENTS 993 3/1979 European Pat. Off. .

Primary Examiner—O. R. Vertiz
Assistant Examiner—Wayne A. Langel
Attorney, Agent, or Firm—Cushman, Darby & Cushman

[57] ABSTRACT

In an ammonia production process a hydrocarbon steam mixture (16) is preheated (18, 24) and reacted in an adiabatic catalyst bed (22, 26), the resulting methane-containing gas is reacted (30) with air (32) to introduce more than 1 $N_2$ per $3H_2$ and purified (44, 48, 54) the purified gas is passed to ammonia synthesis (66) in admixture with a hydrogen-rich stream (82) separated at 80 from reacted synthesis gas, and the rate of flow of that stream is controlled so that the $H_2:N_2$ ratio of the gas entering the synthesis catalyst is in the range 1.0 to 2.5. Preferably methane is purged at 86 to the extent of 5-15% of the hydrocarbon feedstock.

9 Claims, 1 Drawing Figure

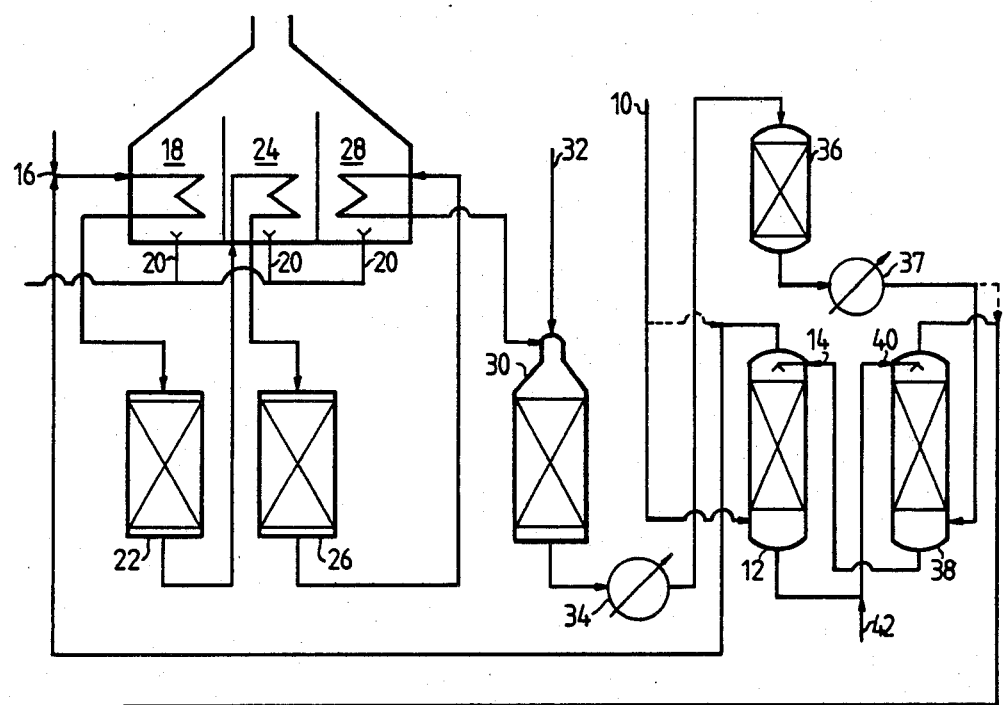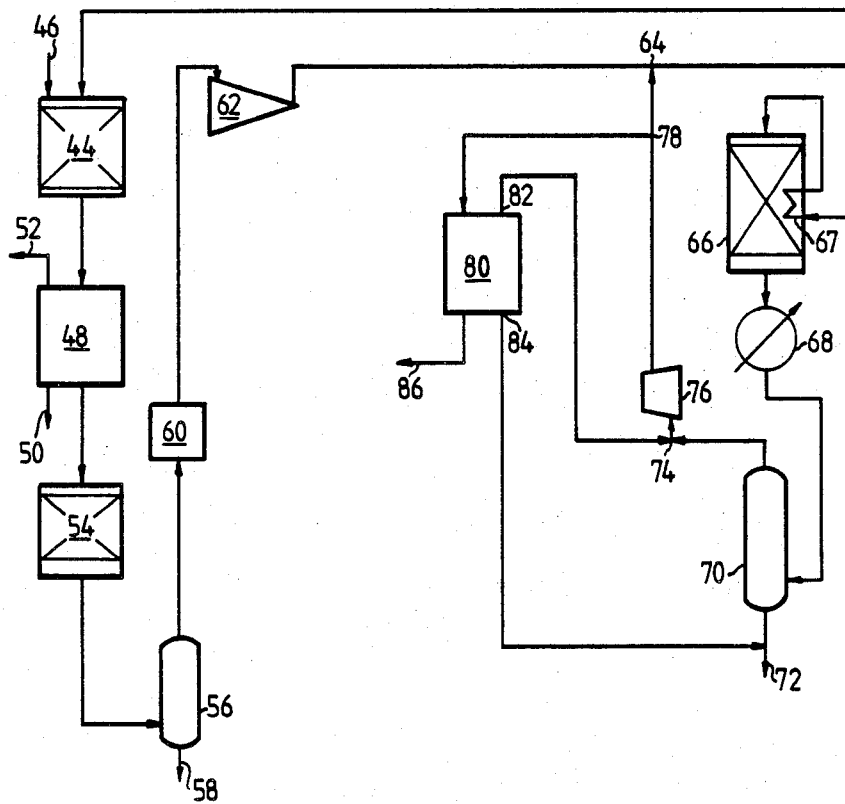

AMMONIA PRODUCTION PROCESS

This invention relates to an ammonia production process capable of operation at a relatively low rate of energy consumption per unit quantity of product.

An ammonia production process comprises a synthesis gas generation section in which usually a carbonaceous feedstock is reacted with steam and air and the resulting gas is processed to give a purified ammonia synthesis gas and compressed, and a synthesis section in which the synthesis gas is reacted to ammonia over a synthesis catalyst and ammonia is recovered in liquid form. Compression of the synthesis gas consumes much power, and accordingly efforts have been made, especially over the last 30 years, to decrease power consumption by increasing the pressure at which the synthesis gas is generated and fed to the compressor, and by decreasing the pressure in the synthesis section. These efforts are constrained by the facts that the pressure of synthesis gas generation by hydrocarbon steam reforming is limited to what alloy reforming tubes will withstand at the high temperatures involved, and that, if the synthesis pressure is too low, the ammonia has to be recovered either at such low temperatures that power-consuming refrigeration machinery is required or else by absorption in water, from which it has to be separated by energy-consuming distillation.

It has been proposed by Fluor (U.S. Pat. No. 3,743,488, U.S. Pat. No. 3,795,485 and UK Pat. No. 1370064) to carry out hydrocarbon steam reforming at pressures above 700 psig (49 bar abs) by heating the reaction mixture out of contact with the steam reforming catalyst, reacting the heated mixture adiabatically over the catalyst and repeating these two steps until the hydrocarbon is substantially exhausted. For making ammonia synthesis gas the hydrocarbon content of the product gas is less than 8 mol percent and typically between 3 and 8 adiabatic reaction steps are used. The gas is then passed to secondary reforming with air in the usual way, and thence to shift, $CO_2$ removal, and compression to 1500-1000 psig (105-690 bar abs).

It has been proposed by the British Gas Corportion (UK Pat. No. 1043377) to convert a methane-rich gas (as produced by the reaction of naphtha with steam at not over 600° C.) to a town gas containing for example 30-40% v/v of methane on a dry basis by once or twice preheating it and passing it over an adiabatic steam reforming catalyst. Such a succession of preheating and reaction steps is disclosed to be an alternative to reaction in an externally heated catalyst or in the presence of added oxygen or air.

It therefore appears that to obtain hydrocarbon conversion to an extent comparable with conventional tubular externally heated steam reforming a very substantial number of successive preheating and reaction steps is needed. We have now, however, realised that such an extent of conversion is dictated by the requirements of the conventional ammonia synthesis process and can be avoided.

The unconventional features in ammonia production according to our invention are:
I. using in our secondary hydrocarbon steam reformer a quantity of air in excess of what would introduce 1 molecule of nitrogen per 3 molecules of hydrogen;
II. carrying out ammonia synthesis at a pressure not much greater than that at which synthesis gas is generated;
III. in a hydrogen recovery step removing excess nitrogen from gas circulating in the synthesis section to an extent that the returned hydrogen brings the $H_2:N_2$ ratio up to a level still well below 3.0.

As a result more hydrocarbon is converted in the secondary reforming step and less in adiabatic primary reforming steps, no significant power-consumption penalty is incurred in compressing non-reacting gas and the pass-conversion increase due to nitrogen-rich gas is exploited. A particular advantage is that the flow rate of gas in the hydrogen recovery can be kept at a substantially lower level than if the hydrogen recovery rate were large enough to bring the ratio to 3.0. Accordingly power consumption is usefully decreased.

The increase in pass conversion resulting from the use of nitrogen-rich gas was disclosed, for example, by Nielsen ("An investigation on promoted iron catalysts for the synthesis of ammonia", Gjellerups Vorlag, Copenhagen 1968; also in Advances in Catalysis, volume V, 1953 at pages 30–31). A similar effect is described by Hays et al. (Chemical Engineering Progress January 1964, 60, 61–65), and these authors quote the experimental findings of Uchida et al. (Bulletin of the Chemical Society of Japan 1955, 28, 106) that the ratio for maximum pass conversion is smaller the further the mixture leaving the catalyst is from equilibrium. However, these results relate only to laboratory experiments and have not been exploited in industrial ammonia production plants: this is because operation at low hydrogen to nitrogen ratios (a) would involve a waste of energy in compressing excess nitrogen in the fresh synthesis gas and (b) since industrial ammonia synthesis process always involve recycle of unreacted synthesis gas from the ammonia recovery step, would involve a wastefully high rate of purge of synthesis gas.

According to the invention an ammonia production process comprises
(a) primary catalytically reforming a hydrocarbon feedstock with steam at superatmospheric pressure and in conditions of steam-to-carbon ratio, pressure and temperature to produce a gas containing carbon oxides, hydrogen and at least 10% v/v of methane on a dry basis;
(b) secondary catalytically reforming the gas from step (a) by introducing air and bringing the mixture towards equilibrium, whereby to produce a gas containing nitrogen, carbon oxides, hydrogen and a decreased quantity of methane; the quantity of air used being in excess of what would introduce 1 molecule of nitrogen per 3 molecules of hydrogen;
(c) converting carbon monoxide catalytically with steam to carbon dioxide and hydrogen;
(d) removing carbon oxides to give fresh nitrogen-hydrogen ammonia synthesis gas;
(e) reacting the synthesis gas to produce ammonia and recovering ammonia from the reacted gas; and
(f) treating synthesis gas after reaction to synthesise ammonia to separate a stream enriched in hydrogen and returning the enriched stream to the synthesis; and is characterised by
X. controlling the rate of flow of the stream enriched in hydrogen so that the hydrogen to nitrogen molar ratio of the gas entering the synthesis catalyst is in the range 1.0 to 2.5; and
Y. operating step (a) in at least one adiabatic catalyst bed and providing the endothermic heat of reaction by preheating, whereby the temperature of the reacting gas falls as it proceeds through the catalyst bed.

Steps (a) to (f) characterise the process of our European published application 993.

The $H_2:N_2$ molar ratio is preferably in the range 1.5 to 2.3 in the gas entering the synthesis catalyst. Whatever its ratio within the defined broad or preferred range, it is maintained preferably within 20% of the ratio in the fresh synthesis gas produced in step (d). By this means the rate of flow of the hydrogen recovery stream and thus the power consumption are limited.

The required $H_2:N_2$ molar ratio in fresh synthesis gas can be attained without excessive catalyst outlet temperatures provided the steam to carbon ratio in the primary and secondary reforming steps is high enough. To make synthesis gas at a pressure over 30 bar abs, especially in the range 40–80 bar abs, a steam ratio in the range 4–8 is preferably used. The primary reforming final catalyst bed preferably operates at an outlet methane content in the range 25–35% v/v on a dry basis. The methane content of the gas leaving the secondary reformer is preferably in the range 1.5 to 3% on a dry basis. Such methane contents are substantially higher than have previously been considered suitable for ammonia production. They are specified, however, because it is now realised (1) that the plant required for removing excess nitrogen from synthesis gas can also remove methane; (2) that since a final nitrogen purge will normally contain some methane and hydrogen, it is better to provide in it a sufficient methane content to make it readily usable as a fuel; (3) the percentage of methane finally purged need be no higher than 15% of the starting process hydrocarbon in order to provide substantial advantages at the synthesis gas generation steps, and such methane is not wasted but is used as fuel in the reactants heaters. As a result the reactants need not be preheated to over 750° C. before the primary and secondary reforming steps and the secondary outlet temperature need not be over 900° C. Over-all a methane purge rate of 5–15% of the initial feedstock provides the optimum energy economy (% by carbon atoms).

Since the reactants are preheated to not over 750° C. the steam/hydrocarbon reaction takes place at temperatures lower than 750° C. and possibly as low as 550°–650° C. Consequently a catalyst having adequate low temperature activity should be chosen. A very suitable catalyst comprises nickel on a refractory secondary support on a metal or alloy primary support, as described in our copending European application No. 80301982 (publication No. 21736).

The preheater for one or more of the primary reforming steps and the secondary reformer is preferably a pressurised furnace. The pressure of the gases brought into heat exchange with the reactants is suitably at least 5 bar abs and preferably within 30 bar abs of the pressure of the reactants. By this means the life of the tubes through which the reactants flow in the furnace can be very usefully lengthened and/or the tubes can be made of thinner or cheaper metal, despite the unusually high preheating temperatures that are preferred. If the heating fluid is combustion gas a useful energy recovery as expansion engine power and waste heat is possible. The heating fluid can be at a pressure dictated by its source, for example it may be helium heated in a nuclear reactor.

Whether the furnace is pressurised or not, it is an advantage that it can readily be designed to accept fuels other than gaseous or vaporised hydrocarbons. Consequently the process of the invention has a flexibility of plant design not available in the conventional process using a steam reforming furnace. In particular the furnace can be of the fluidised solid fuel type.

The steps of converting carbon monoxide catalytically with steam and removing carbon oxides are conventional as described in our European application No. 993, the relevant parts of which are incorporated herein by reference. Especially since it is preferred to operate the primary and secondary reforming steps at relatively low temperatures, even though this results in a rather higher methane content than was previously considered suitable for ammonia synthesis gas, it is preferred to remove carbon monoxide finally by selective oxidation. This leaves carbon dioxide in the gas, and this can be removed largely by contact with a liquid absorbent, as disclosed in our European application No. 993. Residual carbon dioxide can then be removed by methanation or adsorption or treatment with non-regenerable alkali.

Especially at the preferred high steam ratio at the primary reforming step it becomes advantageous to carry out the carbon monoxide conversion in a different way, namely in a single stage at an inlet temperature in the range 250°–325° C. and an outlet temperature up to 400° C., especially up to 350° C. For such a process the steam-to-gas volume ratio is preferably at least 0.8 which, with suitable temperature control, enables the outlet CO content to be low enough for final removal by methanation. If selective oxidation is used, the outlet CO content can be up to 2.0% v/v on a dry basis instead of up to about 0.5% in a conventional shift process to be followed by methanation, because each molecule of CO removed by oxidation results in one lost $H_2$ molecule only. The advantages of such a shift process are that more heat can be recovered from the hot gas before shift and that at pressures over 30 bar abs. the temperature can be well above the dewpoint of steam and catalyst damage avoided. The catalyst can be supported copper, suitably with zinc oxide and one or more refractory oxides such as alumina.

As a separate and broader aspect the invention provides a process for producing hydrogen by the steps of
(a) reacting carbon monoxide with steam to produce carbon dioxide and hydrogen;
(b) removing carbon dioxide substantially by contacting the product of step (a) with a liquid $CO_2$-absorbent; and
(c) removing residual carbon oxides;
and characterised by carrying out step (a) over a supported copper catalyst at an inlet and outlet temperature as specified, whereby to produce a gas containing 0.1 to 2.0% of CO on a dry basis; and by removing CO substantially by selective oxidation.

If the hydrogen is to be used for ammonia synthesis the oxidising agent can be air. The selective oxidation catalyst is suitably supported platinum (0.01 to 2.0% w/w) containing possibly one or more of manganese, iron, cobalt or nickel as a promoter. A description of a suitable selective oxidation process is given in UK No. 1555826 and in the articles by Colby et al (23rd Symposium on safety in ammonia plants and related facilities, Am. Inst. Chem. Engrs. Conv., Miami, November 1978) and Bonacci et al. (Am. Inst. Chem. Engrs. Symposium, Denver, August 1977).

After carbon oxides removal, though possibly before methanation, the gas is compressed preferably by 20–80 bar, in a single-barrel compressor.

One preferred process according to the invention is shown as flowsheet in the accompanying drawing.

The hydrocarbon feedstock, natural gas, is desulphurised by known means (not shown) and fed at 10 to the lower portion of packed tower 12, in which it rises through a falling stream of hot water fed in at 14 from a source to be described. The resulting water-saturated gas is mixed, if necessary, with steam at 16. (In an alternative process, shown by the dotted line, towers 12 and 38 are not used and all the steam is added as such at 16). The mixture is preheated to 700° C. in furnace 18 fired at 20 with natural gas, which for this purpose need not be thoroughly, if at all, desulphurised. The heated gas is then passed over a supported nickel catalyst in insulated reactor 22. The endothermic methane/steam reaction $$CH_4 + H_2O \rightarrow CO + 3H_2$$

takes place and the temperature falls, reaching 564° C. at the catalyst outlet. The resulting gas is then reheated to 700° C., in furnace 24 and passed over a supported nickel catalyst in insulated reactor 26. Here further methane/steam reaction takes place and the temperature falls, reaching 689° C. at the catalyst outlet. The resulting gas is reheated to 700° C. and passed into secondary reformer 30. Here it encounters a stream of hot air (700° C.) fed in at 32. The temperature rises initially as hydrogen burns with a flame, but over the catalyst further methane/steam reaction takes place and the temperature falls to 857° C. at the catalyst bed outlet. The temperature and rate of feed of air are chosen so that the gas leaving 30 contains nitrogen in excess of what can react later with hydrogen to produce ammonia. It also contains methane to an extent that would normally be regarded an excessive in ammonia synthesis gas: this is preferred because the feedstock economy due to more complete methane reaction would entail extra energy consumption in compressing air and in removing nitrogen later or, alternatively or additionally, would require higher fuel consumption in furnaces 18, 24 and 28 or even a further heating and reaction step. Furnaces 18, 24 and 28 include flue gas heat recoveries such as combustion air preheaters and boiler feed water heaters but for the sake of clarity these are not shown.

Gas leaving secondary reformer 30 is cooled at 34, which represents heat recovery by high pressure steam generation and one or more of boiler feed water heating and natural gas preheating. The cooled gas, now at about 300° C., is passed into shift reactor 36 and there it reacts exothermically over a copper-containing catalyst and becomes heated to 335° C. The gas is cooled with heat recovery in boiler 37. It is contacted with water in packed tower 38 and there cooled and depleted of part of its content of steam. The resulting heated water is passed 14 into tower 12 already mentioned. The cool water fed to tower 38 at 40 is derived in part from tower 12 in which heated water from the bottom of tower 38 is cooled by evaporation and partly from supplementary water fed in at 42 from external supplies or from point 50 or 58 to be described.

Water-depleted gas leaving tower 38 overhead is reacted with air fed at 46 over a noble metal catalyst in selective oxidation unit 44. (In the alternative process following the dotted line item 37 includes also further cooling and water removal). The CO-free gas leaving 44 is passed to cooling, water-removal and $CO_2$-removal units, which are conventional and are indicated generally by item 48. At 50 the water contains dissolved carbon dioxide but with simple purification can be fed to point 42. At 52 the carbon dioxide can be expanded in an engine to recover energy. After unit 48 the gas contains residual $CO_2$, and this is made harmless by preheating the gas and reacting it over a supported nickel catalyst in methanation reactor 54. The gas is then cooled, largely freed of water in catchpot 56 and thoroughly dried by adsorption in unit 60. Water taken at 58 from catchpot 56 can be used at point 42.

The dried gas is compressed at 62, mixed at 64 with recycle gas to be described, heated to synthesis inlet temperature and fed to reactor 66 (this reactor is shown with a single catalyst bed but in practice would include a plurality of beds and conventional means for feed gas preheating and temperature control. It is, however, preferred in any event to have feed gas preheater 67 upstream of part of the catalyst, so that hot gas from the downstream-most bed can pass to external heat recovery 68 without cooling). After heat recovery 68 the gas is cooled by conventional means (not shown) including moderate refrigeration, to below the dewpoint of ammonia and passed to catchpot 70 from which liquid product ammonia is run off at 72. Unreacted gas passes out overhead; at this stage it contains less hydrogen per nitrogen molecule than the gas fed to reactor 66, because ammonia formation uses three $H_2$ molecules per nitrogen molecule, but at 74 it receives a feed of hydrogen-rich gas to be described below. The mixed gas is fed to circulator 76, which increases its pressure by 10–20%, and is then divided at 78 into a synthesis recycle stream (which is fed to point 64) and a hydrogen recovery stream. This stream is fed to separation section 80. Here it is washed with water to remove ammonia, dried and resolved cryogenically or by absorption or selective diffusion into the hydrogen-rich stream fed to point 74 and a waste stream 86, which may have fuel value. The aqueous ammonia is distilled under pressure and the resulting anhydrous ammonia is fed out at 84 to the main product offtake 72.

The table sets out the process conditions, gas compositions and hourly flow rates in a process for making 1000 metric tons per day of ammonia from a natural gas of average composition $CH_{3.88}$ containing 2.4% v/v of nitrogen and 0.1% v/v of $CO_2$. This process follows the dotted paths on the flowsheet.

TABLE

| Position | Temp °C. | Pressure bar abs | CO | $CO_2$ | $H_2$ | $CH_4$ | Ar | $N_2$ | $O_2$ | $NH_3$ | $H_2O$ | Flow Rate kg mol h$^{-1}$ |
|---|---|---|---|---|---|---|---|---|---|---|---|---|
| 22 inlet | 700 | 51.27 | — | 0.02 | — | 16.59* | — | 0.38 | — | — | 83.01 | 8476 |
| 22 outlet | 564 | 50.86 | 0.17 | 3.21 | 12.33 | 12.26 | — | 0.36 | — | — | 71.67 | 8995 |
| 26 inlet | 700 | 50.86 | | | | | | | | | | |
| 26 outlet | 629 | 50.46 | 0.52 | 4.27 | 17.63 | 10.39 | — | 0.35 | — | — | 66.85 | 9275 |
| 30 inlet | 700 | 50.46 | 0.52 | 4.27 | 17.63 | 10.39 | — | 0.35 | — | — | 66.85 | 9275 |
| | 700 | 55.22 | — | 0.03 | — | — | 0.92 | 78.06 | 20.99 | — | — | 2401 |
| 30 outlet | 857 | | | | | | | | | | | |

TABLE-continued

| Position | Temp °C. | Pressure bar abs | CO | CO$_2$ | H$_2$ | CH$_4$ | Ar | N$_2$ | O$_2$ | NH$_3$ | H$_2$O | Flow Rate kg mol h$^{-1}$ |
|---|---|---|---|---|---|---|---|---|---|---|---|---|
| 36 inlet | 300 | } 49.85 | 3.95 | 5.92 | 26.89 | 1.13 | 0.17 | 14.89 | — | — | 47.06 | 12809 |
| 36 outlet | 335.5 | 49.25 | 0.35 | 9.51 | 30.49 | 1.13 | 0.17 | 14.89 | — | — | 43.46 | 12809 |
| 44 outlet | 35 | 49.25 | — | 9.80 | 30.29 | 1.12 | 0.18 | 15.44 | — | — | 43.17 | 12894 |
| 54 inlet | 300 | 49.25 | — | 0.05 | 64.28 | 2.38 | 0.38 | 32.76 | — | — | 0.14 | 6075 |
| 60 outlet | 35 | 48.23 } | — | — | 64.3 | 2.44 | 0.38 | 32.87 | — | — | — | 6054 |
| 62 outlet | 136 | 100.72 | | | | | | | | | | |
| 66 inlet | 295 | 100.00 | — | — | 61.79 | 3.84 | 1.57 | 28.1 | — | 4.7 | — | 30157 |
| 66 outlet | 438 | 93.02 } | — | — | 54.00 | 4.18 | 1.71 | 26.15 | — | 13.96 | — | 27706 |
| 70 inlet | −1.0 | 90.50 | | | | | | | | | | |
| 70 overhead | −1.08 | 89.98 | — | — | 58.76 | 4.54 | 1.86 | 28.46 | — | 6.37 | — | 25447 |
| 70 bottoms | −1.08 | 89.98 | — | — | 0.27 | 0.09 | 0.02 | 0.15 | — | 99.47 | — | 2258 |
| 76 inlet | 24.77 | 89.88 } | — | — | 61.16 | 4.19 | 1.87 | 26.89 | — | 5.88 | — | { 27566 |
| 80 inlet | 38.0 | 100.72 | | | | | | | | | | 3463 |
| 82 | 20 | 89.88 | — | — | 90.0 | — | 2.0 | 8.0 | — | — | — | 2118 |
| 84 | — | — | — | — | — | — | — | — | — | 100 | — | 194 |
| 86 | 5.4 | 4.76 | — | — | 18.85 | 12.72 | 1.98 | 66.44 | — | — | — | 1151 |

*At this position but not thereafter the percentage under "CH$_4$" in fact relates to the natural gas hydrocarbon of average composition CH$_{3.88}$.

I claim:

1. In an ammonia production process which comprises
   (a) primary catalytically reforming a hydrocarbon feedstock with steam at superatmospheric pressure and in conditions of steam-to-carbon ratio, pressure and temperature to produce a gas containing carbon oxides, hydrogen and at least 10% v/v methane on a dry basis;
   (b) secondary catalytically reforming the gas from step (a) by introducing air and bringing the mixture towards equilibrium, whereby to produce a gas containing nitrogen, carbon oxides, hydrogen and a decreased quantity of methane, the quantity of air used being in excess of what would introduce 1 molecule of nitrogen per 3 molecules of hydrogen;
   (c) converting carbon monoxide catalytically with steam to carbon dioxide and hydrogen;
   (d) removing carbon oxides to give a nitrogen-hydrogen ammonia synthesis gas;
   (e) reacting the synthesis gas over an ammonia synthesis catalyst to produce ammonia and recovering ammonia from the reacted gas; and
   (f) treating synthesis gas after reaction to synthesise ammonia to separate a stream enriched in hydrogen and returning the enriched stream to the synthesis;
and, the steps comprising
   X. controlling the rate of flow of the stream enriched in hydrogen so that the hydrogen to nitrogen molar ratio of the gas entering the synthesis catalyst is in the range 1.0 to 2.5; and
   Y. operating step (a) in at least one adiabatic catalyst bed and providing the endothermic heat of reaction by preheating the reactants, whereby the temperature of the reacting gas falls as it proceeds through the catalyst bed.

2. A process according to claim 1 in which the hydrogen to nitrogen molar ratio of the gas entering the synthesis catalyst is in the range 1.5 to 2.3.

3. A process according to claim 1 in which the hydrogen to nitrogen ratio of the gas entering the synthesis catalyst is maintained within 20% of the ratio in the fresh synthesis gas produced in step (d).

4. A process according to claim 1 in which step Y is operated at a pressure in the range 40–80 bar abs and a steam to carbon ratio in the range 4 to 8.

5. A process according to claim 1 in which the final primary reforming catalyst bed in step Y operates an an outlet methane content in the range 25–35%.

6. A process according to claim 1 in which the methane content of the gas leaving the secondary reformer is in the range 1.5 to 3.0%.

7. A process according to claim 1 in which step (f) is operated so as to purge methane to the extent of 5–15% by carbon atoms of the initial hydrocarbons feedstock.

8. A process according to claim 1 in which in step Y preheating is carried out in a pressurized furnace in which the pressure of the gases brought into heat exchange with the reactants is within 30 bars of the pressure of the reactants.

9. A process according to claim 1 which comprises cooling the gas leaving the secondary reformer to a temperature in the range 250°–325° C., subjecting it to the shift reaction over a supported copper catalyst at an outlet temperature up to 400° C. and removing residual carbon monoxide in the shifted gas by selective oxidation.

* * * * *